United States Patent [19]

Hümke et al.

[11] Patent Number: 5,639,361
[45] Date of Patent: Jun. 17, 1997

[54] BINDER SYSTEM FOR ELECTRODEPOSITION COATING

[75] Inventors: Klaus Hümke, Friedelsheim; Udo Strauss, Münster; Hans Schupp, Worms; Thomas Schwerzel, Meckenheim; Dieter Faul, Niederkirchen; Helmut Fobbe, Iserlohn, all of Germany

[73] Assignee: BASF Lacke + Farben, AG, Muenster-Hiltrup, Germany

[21] Appl. No.: 522,236

[22] PCT Filed: Mar. 7, 1994

[86] PCT No.: PCT/EP94/00672

§ 371 Date: Oct. 3, 1995

§ 102(e) Date: Oct. 3, 1995

[87] PCT Pub. No.: WO94/21736

PCT Pub. Date: Sep. 29, 1994

[30] Foreign Application Priority Data

Mar. 17, 1993 [DE] Germany ............ 43 08 428.1

[51] Int. Cl.$^6$ .................. C25D 11/00; C08J 3/03; C08L 31/04

[52] U.S. Cl. ................ 205/317; 204/499; 204/502; 204/503; 524/591; 524/507; 525/123; 525/455

[58] Field of Search ................ 205/50, 316, 317; 524/591, 507; 525/123, 455; 204/499, 500, 501, 502, 503

[56] References Cited

U.S. PATENT DOCUMENTS 5,089,101  2/1992  Hayashi et al. ............ 204/503

FOREIGN PATENT DOCUMENTS 0 184 467 A2  7/1985  European Pat. Off. ......... C09D 5/02

Primary Examiner—T. Tung
Assistant Examiner—Alex Noguerola

[57] ABSTRACT

Binder systems suitable for electrodeposition coating and based on basic, thermally crosslinkable epoxy or polyurethane resins as binders (B), containing from 0.001 to 1% by weight of a polymer (I) whose predominant components are ethyl acrylate and/or n-propyl acrylate, based on the overall solids content of the binder system.

9 Claims, No Drawings

BINDER SYSTEM FOR ELECTRODEPOSITION COATING

DESCRIPTION

The present invention relates to new binder systems which are suitable for electrodeposition coating and are based on basic, thermally crosslinkable epoxy or polyurethane resins as binders (B), containing from 0.001 to 1% by weight of a polymer (I) whose predominant components are ethyl acrylate and/or n-propyl acrylate, based on the overall solids content of the binder system.

The invention also relates to new pigment paste formulations for electrodeposition coating which contain the polymers (I). The invention relates, furthermore, to a method of electrodeposition coating using the new binder systems, to the use of polymers (I) as an additive to electrodeposition baths for improving the surface quality of the articles coated by means of electrodeposition, and to the coated articles themselves.

It is generally known to coat metallic articles with the aid of cathodic electrodeposition, a process of which use is made, in particular, in the motor vehicle industry. The electrodeposition coating systems used for this purpose generally contain, as fundamental components, a binder, also called base resin, a crosslinking component and a pigment paste.

Epoxy and polyurethane resins are known, as binders, in numerous configurations. EP-A 261 385 describes binder combinations for cathodic electrodeposition coating which crosslink by means of external agents and are based on an epoxy resin, containing hydroxyl and amino groups, and on a poly(meth)acrylate resin containing amino groups. Also known are coating systems which contain, in addition to the principal components, auxiliaries which reduce the surface tension in the coating material and thus improve the surface quality of electrodeposition-coated articles. The addition of these auxiliaries is necessary, in particular, if the binder systems used have a tendency toward problems in coating flow and toward the formation of craters in the coating film and give rise to adhesion problems in respect of the topcoats applied subsequently. The binder systems known to date which contain silicone oils, polyether-urethanes (DE-A 37 01 547) or polybutyl acrylates (EP-A 422 533) as auxiliaries impart to the finished coating materials the abovementioned, disadvantageous properties, in a more or less pronounced form.

The object of the present invention was to find new binder systems based on basic, thermally crosslinkable epoxy or polyurethane resins as binders, which exhibit a good behavior in respect of both the surface quality of the cathodically deposited coatings and the adhesion of topcoats applied subsequently.

To this end the binder systems defined at the outset were found.

Also found were new pigment paste formulations for electrodeposition coating, a method of electrodeposition coating using the new binder systems, and the use of polymers (I) as an additive to electrodeposition baths for improving the surface quality of the articles coated by means of electrodeposition, and the coated articles themselves.

The binder systems according to the invention contain from 0.001 to 1% by weight, preferably from 0.01 to 0.75% by weight, of a polymer (I) whose predominant components are ethyl acrylate and/or n-propyl acrylate, based on the overall solids content of the binder system. The term "predominant components" should be understood as referring to those quantities of ethyl and/or n-propyl acrylate whose content in a polymer (I) is more than 50 mol %. Particularly suitable polymers (I) are homopolymers of ethyl acrylate and of n-propyl acrylate and copolymers of these two monomer building blocks.

Other suitable polymers (I) are those containing minor quantities of other olefinically unsaturated monomers. Their proportion, based on the polymer (I), is generally less than 50 mol %, preferably from 0.1 to mol %. Examples of comonomers which can be used are the following:

monomers containing amino groups, e.g. N-dialkylaminoalkyl acrylates and methacrylates such as
N-dimethylaminoethyl acrylate
N-dimethylaminoethyl methacrylate
N-diethylaminoethyl acrylate
N-diethylaminoethyl methacrylate
N-dimethylamino-n-propyl acrylate
N-dimethylamino-n-propyl methacrylate
N-diethylamino-n-propyl acrylate and
N-diethylamino-n-propyl methacrylate
and N-dialkylaminoalkylacrylamides and -methacrylamides such as
N-dimethylaminoethylacrylamide
N-dimethylaminoethylmethacrylamide
N-diethylaminoethylacrylamide and
N-diethylaminoethylmethacrylamide
in which context N-alkanol-substituted derivatives of aminoalkyl acrylates and methacrylates and aminoalkylacrylamides and -methacrylamides, and vinyl-substituted heterocycles containing tertiary amino functions, such as N-vinylimidazole, are also suitable;

monomers containing hydroxyl groups, e.g. hydroxyalkyl acrylates and methacrylates such as
2-hydroxyethyl acrylate
2-hydroxyethyl methacrylate
3-hydroxypropyl acrylate
3-hydroxypropyl methacrylate
4-hydroxybutyl acrylate and
4-hydroxybutyl methacrylate
alkyl acrylates such as
i-propyl acrylate
n-butyl acrylate
i-butyl acrylate
n-pentyl acrylate and
n-hexyl acrylate
alkyl methacrylates such as
ethyl methacrylate
n-propyl methacrylate
i-propyl methacrylate
n-butyl methacrylate
i-butyl methacrylate
n-pentyl methacrylate
n-hexyl methacrylate and
2-ethylhexyl methacrylate The polymers (I) generally have an average molecular weight of between 5000 and 50,000, preferably between 500 and 25,000.

The preparation of I is known per se and can be carried out in a conventional manner by free-radical polymerization, for example by solution polymerization at a temperature of from 50° to 200° C., in particular from 70° to 150° C. Examples of suitable solvents are n-butanol, isobutanol, sec-butanol, tert-butanol, dioxane, tetrahydrofuran, acetone, methoxypropanone, methoxy-, ethoxy- and n-butoxyethanol and diethylene glycol dimethyl ether, ethylene, propylene and diethylene glycol, with sec-butanol being particularly suitable. Other suitable solvents are cyclohexane, benzene, toluene and xylene.

Free-radical initiators which can be used are the conventional initiator substances such as 1,1'-azobisisobutyronitrile, 1,1'-azobiscyclohexanecarbonitrile, 2,2'-azobis(2-cyanopropane), benzoyl peroxide, di-tert-butyl peroxide, tert-butyl hydroperoxide, cumene hydroperoxide and tert-butyl perbenzoate and, in particular, tert-butyl peroctanoate, the quantity of initiator advantageously being from 0.1 to 5% by weight, preferably from 0.5 to 3% by weight, based on the quantity of monomer employed.

The initiator is generally added as a solution, either in the monomers or, preferably, in the solvent.

In addition, the polymers (I) can be prepared by anionic polymerization using appropriate organolithium compounds as initiators, for example n-butyllithium or methyllithium, in solvents such as diethyl ether or tetrahydrofuran.

The polymers (I) are generally used as dispersions. They can also be used as a solution in the solvents which come from the polymerization.

The dispersions of I are conventionally prepared such that they have a solids content of from 10 to 70% by weight, preferably from 30 to 55% by weight.

The binders (B) in the binder systems according to the invention are basic, thermally crosslinkable polymers of the epoxy and polyurethane resin type. Suitable binders—also called base resin—are those materials which carry groups which can be protonated with acids, for example amino or thiol groups. After protonation these groups ensure the dispersibility of the resins in water. Particularly suitable resins are those containing primary and/or secondary amino groups. Examples of resins containing amino groups are amino-epoxy and amino-polyurethane resins.

All base resins preferably have an average molecular weight $\overline{M}_w$, measurable in the conventional way by means of gel permeation chromatography, of from 200 to 20,000, particularly preferably from 1000 to 15,000. The total number of acid-protonatable groups is on average preferably from 1 to 10, particularly preferably from 2 to 7, per polymer resin chain.

In addition to the polyurethane resins, particularly preferred base resins are those whose basic structures are based on epoxy resins, especially those containing terminal epoxide groups. Particularly suitable epoxy resins are materials containing on average from 1 to 3, preferably from 1.8 to 2.2, epoxide groups per molecule and having an average molecular weight of from 100 to 10,000. Preferred epoxy resins have an average molecular weight $\overline{M}_w$ of from 150 to 5000, in particular from 200 to 3500.

Suitable epoxy resins are the reaction products, obtainable in a conventional manner, of polyhydric phenols with epihalohydrins in the presence of a base.

Examples of polyhydric phenols are:
resorcinol
hydroquinone
4,4'-dihydroxybenzophenone
4,4'-dihydroxybiphenyl
bis(4-hydroxyphenyl)methane
1,1-di(4-hydroxyphenyl)ethane
2,2-di(4-hydroxyphenyl)propane (bisphenol A)
1,1-di(4-hydroxyphenyl)isobutane
1,5-dihydroxynaphthalene and
novolaks Bisphenol A is particularly preferred.

The preferred epihalohydrin is epichlorohydrin. Furthermore, epihalohydrins can also be replaced in whole or in part by polyethers which carry terminal epoxide groups. Examples of these are polyethers composed of ethylene oxide, propylene oxide and tetrahydrofuran.

Resins which can be used in addition to the epoxy resins comprising polyhydric phenols and epihalohydrins are also reaction products of halohydrins and polyhydric aliphatic alcohols such as ethylene glycol, diethylene glycol, triethylene glycol, 1,2-prepylene glycol, 1,3-propylene glycol, 1,4-butanediol, 1,5-pentanediol, 1,6-hexanediol, 1,2,6-hexanetriol, glycerol and 2,2-di(4-hydroxycyclohexane) propane. Very particularly preferred epoxy resins are those which can be obtained by reacting polyhydric phenols, especially bisphenol A, with diglycidyl ethers of bisphenol A. The reaction is usually carried out in the presence of, for example, propylene glycol phenyl ether, xylene or isobutanol as solvent at a temperature of from 50° to 200° C., in particular from 100° to 180° C. The reaction is generally catalyzed by triphenylphosphine or dimethylbenzylamine.

The basic epoxy resins which are suitable as binders are, in particular, amino-epoxy resins which can be obtained by reacting epoxide group-containing resins—preferably with terminal epoxide groups—with an aliphatic amine which carries one or more other functional groups, such as amino groups and/or hydroxyl groups. It is recommended in this context to employ the amine in excess. Aliphatic amines include alkylenediamines, alkanolamines, polyoxyalkylenepolyamines and polyfunctional polyolefin amines.

Suitable such compounds are:
alkylenediamines having two primary amino groups and from 2 to 20 carbon atoms in the alkylene radical, especially ethylenediamine, 1,2- and
1,3-diaminopropane, 1,4-diaminobutane, neopentanediamine and hexamethylenediamine alkylalkanolamines having in each case from 1 to 20 carbon atoms in the alkyl and alkanol radical, in which the chain length of the radicals may be identical to or different from one another, e.g. ethylethanolamine, methylisopropanolamine and especially methylethanolamine polyoxyalkylenepolyamines, e.g. polyoxyethylenepolyamine, polyoxypropylenepolyamine and polyoxybutylenepolyamine polyolefinamines, such as amine-terminal butadiene-acrylonitrile copolymers having an average molecular weight of from 1000 to 10,000

Also suitable are alkylamines, including in particular dialkylamines such as dimethylamine and diethylamine. If desired, the amino-epoxy resins can be chain-extended using dicarboxylic acids, for example sebacic acid or a dimeric fatty acid. The conjoint use of monocarboxylic acids, such as a $C_{12}$ to $C_{24}$ fatty acid, is also possible.

Furthermore, the amino-epoxy resins can be used in a mixture with up to 20% by weight of a polyester. The latter are polycondensation products of dicarbcxylic acids and polyhydric alcohols. They have an average molecular weight of from 200 to 20,000, preferably from 200 to 5000.

Suitable carboxylic acid components are compounds such as maleic acid, succinic acid, glutaric acid, adipic acid, pimelic acid, suberic acid, azelaic acid, sebacic acid, cyclohexanedicarboxylic acid, phthalic acid, isophthalic acid and terephthalic acid, and functional derivatives of these acids.

Alcohol components which may be mentioned are aliphatic diols such as ethylene glycol, diethylene glycol, triethylene glycol, propanediol, butanediol, hexanediol, neopentylglycol and neopentylglycol hydroxypivalate, and also more highly functional alcohols such as trimethylolpropane, glycerol, erythritol, pentaerythritol, trimethylolbenzene and tris(hydroxyethyl) isocyanurate.

Amine components are preferably introduced into the epoxy resins by reaction with so-called amidoamines, i.e.

condensation products of polyamines, preferably aliphatic polyamines such as 1,6-hexamethylenediamine, diethylenetriamine and triethylenetetramine, in which context 1,6-hexamethylenediamine is particularly preferred, and dicarboxylic acids, preferably dimer fatty acids. Carboxy-terminal monocarboxylic acids, preferably $C_{12}$–$C_{20}$-carboxylic acids, can also be incorporated into the amidoamine.

The reaction of the epoxy resin with the amine component is preferably carried out at from 50° to 90° C. in a polar solvent, such as isobutanol and sec-butanol, which is generally present in quantities of from 5 to 50% by weight of the batch. The reaction is generally at an end after two hours.

Other resins which have proven suitable as base resins are basic polyurethane resins having an average molecular weight $\overline{M}_w$ of from 200 to 10,000 made from aliphatic and/or aromatic diisocyanates and aliphatic diols or polyols. Diisocyanates which may be mentioned in particular are tetramethylene diisocyanate, 1,6-hexamethylene diisocyanate, isophorone diisocyanate, diphenylmethane diisocyanate, tolylene diisocyanate, naphthylene diisocyanate and 4,4'-diphenyl ether diisocyanate.

Particularly suitable diols are ethylene glycol, diethylene glycol, triethylene glycol, propanediol, butanediol, hexanediol, neopentylglycol and hydroxypivalic acid neopentylglycol [sic]. However, it is also possible to use more highly functional alcohols such as trimethylolpropane, glycerol, pentaerythritol and trimethylolbenzene.

Among the basic polyurethane resins, aminopolyurethane resins are preferred as base resin. By reacting the isocyanates with amino-terminal, polyfunctional amines it is possible to introduce primary and secondary amino groups into the resin. Suitable amines are compounds containing primary and secondary amine functions, such as diethylenetriamine, triethylenetetramine, tetraethylenepentamine and polyetherdiamines having terminal amino groups. Also suitable, furthermore, are amines having primary and tertiary amine functions, for example dimethylaminopropylamine and diethylaminopropylamine.

Amino groups can be introduced into the polyurethane resin by one of the conventional methods, as are described in, for example, U.S. Pat. No. 4,016,120.

The basic epoxy and polyurethane resins can be converted into a water-soluble or water-dispersible form by protonation with acid. Acids suitable for the partial or complete neutralization are organic acids such as formic acid, acetic acid and lactic acid, but also mineral acids such as phosphoric acid.

For the majority of intended applications, for example those of electrodeposition coating, the binder systems according to the invention contain as additional component a crosslinking agent (V), preferably in a quantity of from 10 to 50% by weight, particularly preferably from 25 to 40% by weight.

The crosslinking agents are in general polyfunctional, monomeric or polymeric compounds which, under the effect of heat, have a crosslinking action via condensation and addition reactions.

Particularly suitable crosslinking agents are blocked isocyanates or mixtures of various isocyanates, and phenolic Mannich bases.

Examples of crosslinking agents of the isocyanate type are 1,6-hexamethylene diisocyanate, naphthalene diisocyanates and triphenylmethane triisocyanates, and the trimers of 1,6-hexamethylene diisocyanate, isophorone diisocyanate and tolylene diisocyanate. Tolylene diisocyanate and isophorone diisocyanate are preferred. The trimer of 1,6-hexamethylene diisocyanate is particularly preferred.

Examples of suitable blocking agents are monohydric alcohols, preferably short-chain aliphatic alcohols such as methanol, ethanol, n-propanol, isopropanol, n-butanol, isobutanol and sec-butanol. Also suitable are monoethers of aliphatic diols, such as ethylene glycol monopropyl ether and ethylene glycol monobutyl ether. Other suitable compounds are secondary amines, preferably short-chain aliphatic amines such as dimethylamine, diethylamine, dipropylamine and dibutylamine, and alkanolamines, especially tertiary alkanolamines such as tri(n-propanol)amine and tri(isopropanol)amine, or mixtures thereof. The polyfunctional isocyanates are reacted with the blocking compounds in a manner known per se in quantities such that, on average, all—as far as possible—isocyanate groups per molecule are blocked.

The crosslinking agents of the phenolic Mannich base type known from DE-A 34 22 457 are aminomethylated phenols which are obtained by reacting polycyclic phenols with formaldehyde and secondary amines.

Examples of other crosslinking agents which can be used are amino resins such as urea, formaldehyde, melamine and benzoguanamine resins, and crosslinking agents which cure by means of transesterification and ester aminolysis, for example β-hydroxyalkyl esters according to EP-A 40 867 and carboalkoxymethyl esters according to DE-A 32 33 139.

It is advantageous to disperse the crosslinking component (V) together with the base resin (B). This can be carried out by mixing (B) and (V), neutralizing the mixture with acid and subsequently dispersing it in water. The mixture of (B) and (V), which generally contains from 50 to 90% by weight of B and from 10 to 50% by weight of V, can also be added to an acid/water mixture.

The conjoint dispersion of (B) and (V) is conventionally adjusted to solids contents of from 15 to 45% by weight.

In general, for the preparation of electrodeposition baths, the binder systems according to the invention which contain the polymer (I), the binder (B) and the crosslinking agent (V) have pigment pastes added to them.

The pigment pastes contain, in addition to the conventional pigments such as titanium dioxide, carbon black and barium sulfate, in general binders, which advantageously are in accordance with the basic resin, and also solvents, fillers such as chalk and sodium silicates, and paint auxiliaries, for example corrosion inhibitors, antifoams, dispersion assistants and curing catalysts.

The pigment pastes are prepared by the conventional methods. The solids content of the pigment pastes is in general from 40 to 70% by weight.

Pigment pastes containing a polymer (I) as binder component are particularly preferred.

In these pigment paste formulations according to the invention, comprising pigments, binders, solvents, fillers and other paint auxiliaries, from 0.0005 to 0.5% by weight, in particular from 0.1 to 0.4% by weight, of a polymer (I) is present.

These pigment paste formulations are prepared, in accordance with the preparation of the pigment pastes, with the further addition of a polymer (I). The pigment paste formulations according to the invention have a solids content of from 40 to 70% by weight.

For the preparation of the aqueous electrodeposition coating baths, either an already finished pigment paste formulation according to the invention or, in each case as individual component, a polymer (I) and a pigment paste can be added to a dispersion of (B) and (V). For electrodeposition coating, the deposition baths are generally adjusted to a solids content of from 10 to 30% by weight.

The binder systems according to the invention and the pigment paste formulations according to the invention are preferably used for electrodeposition coating, in which context the polymers (I) which they contain, whose predominant components are ethyl acrylate and/or n-propyl acrylate, are used as an additive to electrodeposition baths for improving the surface quality of the articles coated by means of electrodeposition.

The cathodic electrodeposition coating is carried out by a known procedure. The deposition of the coating material takes place conventionally at temperatures of between 20° and 35° C. over a period of from 1 to 5 minutes and at a pH of between 5 and 8, preferably at around the neutral point. The deposition voltages are generally between 50 and 500 volts. The electrically conductive articles to be coated, for example degreased deep-drawn metal panels, phosphatized and galvanized steel panels, are connected as cathode. The deposited coating film is advantageously cured at temperatures above 120° C., preferably between 140° and 180° C., over a period of from approximately 10 to 45 minutes. Under these conditions of electrodeposition coating it is possible to produce coating films having a film thickness of from 10 to 35 µm.

Coating films produced by deposition from electrodeposition baths containing the binder systems according to the invention exhibit a good surface quality of the coated articles, i.e. few coating flow problems and little formation of craters, coupled with good adhesion properties of the coats applied subsequently, such as topcoats.

EXAMPLES

1. Preparation of a polymer from ethyl and n-propyl acrylate (I)

A mixture of 220 g (2.2 mol) of ethyl acrylate and 250.8 g (2.2 mol) of n-propyl acrylate was added over the course of two hours under a nitrogen atmosphere to 356 g of boiling sec-butanol. In parallel therewith, a solution of 5.27 g (25 mmol) of tert-butyl peroctanoate in 115 g of sec-butanol was added over a period of 3.5 hours. Subsequently, polymerization was carried out for a further three hours at a temperature of 75° C. The solids content of the reaction solution was 50%.

K value: 18.8 (3% strength solution of I in acetone)

Surface tension: 30 mN/m $\overline{M}_w$: 13,750 g/mol

2. Preparation of an amino-epoxy resin (binder B)

4850 g of a diglycidyl ether made from bisphenol A and epichlorohydrin (epoxide equivalent weight 485) were dissolved at 65° C. in 1039 g of toluene and 1039 g of isobutanol. After this solution had been cooled to 60° C., a solution of 300.4 g (4 mol) of methylethanolamine in 128 g of isobutanol was added. After addition of 1850 g of a solution of an amidoamine, the mixture was heated at 80° C. for 2 hours. The resin had a solids content of 70% and an amine number of 197 mg of KOH per g of resin. The number of acid-protonatable groups and of hydroxyl groups was on average 1.8.

The amidoamine was prepared by reacting 5800 g (50 mol) of 1,6-hexamethylenediamine, 7250 g (12.5 mol) of dimeric fatty acid and 1400 g (5 mol) of linseed oil fatty acid at 195° C., with distillative removal of the water of reaction. After the mixture had been cooled to 100° C. and diluted with 5961 g of toluene, the amine number was 197 mg of KOH per g of resin.

3. Preparation of a crosslinking agent (V)

5042 g (10 mol) of trimerized 1,6-hexamethylenediamine in 3823 g of methyl isobutyl ketone were admixed at 70° C. with 3881 g (30 mol) of di-n-butylamine, and the mixture was maintained at this temperature until virtually no further isocyanate could be detected. The solids content was 70%.

Preparation of a binder/crosslinking agent mixture (B/V)

700 g of amino-epoxy resin (B) and 300 [lacuna] crosslinking agent (V) were admixed with 19 g of acetic acid and dispersed in a quantity of water such that the resulting dispersion had a solids content of 31%. The organic solvents were removed by azeotropic distillation. The dispersion was adjusted to a solids content of 35% with water.

5. Preparation of a pigment paste (PP)

525.8 g of amino-epoxy resin (B) together with 16.5 g of acetic acid were dispersed in 168.7 g of butylglycol and 600 g of water. After the addition of 800 g of titanium dioxide, 11 g of carbon black and 50 g of basic lead silicate the mixture was ground in a ball mill to a particle size of less than 3 µm. The millbase was subsequently adjusted to a solids content of about 50% with water.

6. Preparation of a pigment paste formulation according to the invention, PP/I, from PP and polymer I This pigment paste formulation PP/I was prepared in accordance with Example 5 with the further addition of 10.1 g of polymer I, by dispersion.

Solids content: 49%

7. Preparation of electrodeposition coating dispersions

D1: Preparation of an aqueous dispersion of B/V, I/1 and PP 1095 g of the mixture B/V according to Example 4 were mixed with 10.1 g of the polymer made from ethyl and n-propyl acrylate (I) from Example 1. After addition of 20.7 g of acetic acid, the mixture was dispersed in 1200 g of water. The organic solvents were removed by azeotropic distillation. The resulting dispersion was admixed with 568 g of the pigment paste PP from Example 5, and was stirred and made up to a dispersion quantity of 5000 g with water.

Solids content: 21%

D2: Preparation of an aqueous dispersion of PP/I and B/V 573 g of pigment paste PP/I according to Example 6 were mixed with 1964 g of the mixture B/V according to Example 4, and the mixture was made up to a dispersion quantity of 5000 g with water.

Solids content: 21%

D3: Preparation of an aqueous dispersion of B/V and PP (without polymer I)

1095 g of the mixture B/V according to Example 4 were admixed with 20.7 g of acetic acid and dispersed in 1200 g of water. The resulting dispersion had a solids content of 34%. The dispersion obtained was admixed with 568 g of pigment paste PP according to Example 5, and was stirred and made up to a dispersion quantity of 5000 g with water.

Solids content: 21%

The aqueous electrodeposition coating dispersions D1–D3 were aged at room temperature for 5 days with stirring.

Applications testing

Coating films were deposited conventionally on phosphatized steel panels connected as cathode at 27° C. over a period of 2 minutes, and were baked at a temperature of 160° C. for 20 minutes. At deposition voltages of from 350 to 430 V, film thicknesses of from 22 to 24 µm were achieved.

The quality of the deposited coating films was determined on the basis of six investigations. Assessment was in each case visual.

The following investigations were carried out:

(a) Bridging at panel seams and flanges

This test examines the extent to which bridges of coating material develop at panel seams and flanges of interconnected workpieces. For this purpose test panels which following coating deposition retain residues of coating material in the panel seams and flanges are subjected to a washing procedure with desalinated water. In this procedure, however, the residues of coating material are not always completely removed, so that during the subsequent baking procedure bridges of coating material are formed from the residues which remain.

| Assessment: | 0 ≅ | no bridging |
|---|---|---|
| | 5 ≅ | extensive bridges of coating material |

(b) Coating material runs at panel seams and flanges

This test is carried out in accordance with (a) on workpieces standing vertically. During the baking procedure the residues of coating material not removed completely by the washing procedure run out of the panel seams and flanges, since the viscosity of the coating material decreases initially because of the rising temperature. The subsequent rise in viscosity at the crosslinking temperature of the coating material leads to the formation of runs—also called paint noses.

| Assessment: | 0 ≅ | no marks |
|---|---|---|
| | 5 ≅ | extensive paint noses |

(c) Oil-splash sensitivity and contamination resistance

Substances such as fats and silicone oils can pass from the workpieces to be coated into the electrodeposition bath, and reduce the surface tension of the coating material. During the deposition coating procedure they are deposited together with the coating material. During baking, substances of this kind present on and in the coating film bring about a paint flux. These flux phenomena have their beginnings at the points where the interfering substances are deposited, and have the appearance of craters in the baked coating film.

| Assessment: | 0 ≅ | no effect |
|---|---|---|
| | 5 ≅ | extensive cratering |

(d) Sensitivity to water-spotting

This test assesses plastic marks caused during the baking procedure by the boiling of water drops.

After deposition of the coating material the workpieces are washed with desalinated water in a spraying zone and pass, attached to a suspension device, through an oven zone for the baking procedure. Drops of water which fall from this device onto the washed coating surface, and traces of water remaining on the coating from the prior washing procedure, can bring about—through boiling—plastic marks on the coating film during baking, for example in the form of small bubbles.

| Assessment: | 0 ≅ | no marks |
|---|---|---|
| | 5 ≅ | severe boil marks |

(e) Salt spray test SST (in accordance with DIN 50017)

This test serves to assess the adhesion properties of topcoats. For this purpose the untreated and slit panels are exposed for 240 hours at 35° C. to a 5% strength salt solution, which is applied as a fine mist in a spray chamber. Subsequently the extent of under-rusting at the slit is measured in mm (in accordance with DIN 50017), averaged over 5 sample panels.

(f) Topcoat adhesion test

Crosshatch cuts passing through the coating to the surface of the panel are carried out on the coated test panels. The adhesion of the topcoat is tested using adhesive strips. The quantitative delamination of the coating is assessed visually using the following percentage gradings.

| Assessment: | 0 ≅ | no delamination |
|---|---|---|
| | 1 ≦ 5% | " |
| | 2 ≦ 15% | " |
| | 3 ≦ 35% | " |
| | 4 ≦ 65% | " |
| | 5 > 65% | " |

The same investigations are carried out on coated test panels which have been exposed beforehand for 240 hours to a salt-containing atmosphere in accordance with DIN 50 017 (salt spray test, (e)).

The results are compiled in the table.

TABLE

| | Dispersions | | |
|---|---|---|---|
| | D1 | D2 | D3 (without polymer I) |
| (a) Bridging at panel seams and flanges | 4 | 3 | 5 |
| (b) Runs at panel seams and flanges | 3 | 3 | 5 |
| (c) Oil-splash sensitivity and contamination resistance | 3 | 2 | 4 |
| (d) Sensitivity to water-spotting | 3 | 3 | 4–5 |
| (e) Salt spray test (DIN 50017) Extent of under-rusting at the slit (mm) | 1.4 | 1.5 | 1.4 |
| (f) Topcoat adhesion test before/after 240 h salt spray test | ½ | ½ | ½ |

We claim:

1. A cathodic electrodeposition composition comprising a binder system, said binder system comprising:
   a) at least one basic, thermally crosslinkable resin selected from the group consisting of epoxy resins, polyurethane resins, and mixtures thereof, and
   b) from 0.001 to 1% by weight, based on the overall solids content of the binder system, of an acrylic polymer that is a copolymer consisting essentially of monomers selected from the group consisting of ethyl acrylate, n-propyl acrylate, and mixtures thereof.

2. A composition according to claim 1, wherein the acrylic polymer of (b) is present at a level of about from 0.01 to 0.75% by weight of the binder system.

3. A composition according to claim 1, wherein the crosslinkable resin has an average molecular weight $M_w$ of from about 200 to 20,000.

4. A composition according to claim 1, wherein the crosslinkable resin comprises an epoxy resin obtained by reacting 2,2-di(4-hydroxyphenyl)propane, epichlorohydrin, and an aliphatic amine.

5. A method of cathodic electrodeposition coating, comprising the steps of:
   a) preparing an electrodeposition coating composition according to claim 1;
   b) immersing an article to be coated as cathode into the cathodic electrodeposition coating composition;
   c) passing a deposition voltage between about 50 to 500 volts over a period of from about 1 to 5 minutes to deposit a coating on the article;
   removing the article; and
   e) curing the deposited coating.

6. A coated article comprising a coating that includes a composition according to claim 1.

7. A pigment paste composition suitable for cathodic electrodeposition coating, comprising compounds selected from the group consisting of pigments, binders, solvents, fillers, and other paint auxiliaries; and wherein said pigment paste composition includes from 0.0005 to 0.5% by weight, based on the overall solids content of the pigment paste composition, of an acrylic polymer that is a copolymer consisting essentially of monomers selected from the group consisting of ethyl acrylate, n-propyl acrylate, and mixtures thereof.

8. A method of cathodic electrodeposition coating, comprising the steps of:
   a) preparing an electrodeposition coating composition;
   b) adding to the electrodeposition coating composition a pigment paste composition according to claim 7;
   c) immersing an article to be coated as cathode into the cathodic electrodeposition coating composition;
   d) passing a deposition voltage between about 50 to 500 volts over a period of from about 1 to 5 minutes to deposit a coating on the article;
   e) removing the article; and
   f) curing the deposited coating.

9. A method for improving the surface quality of a cured film obtained from a cathodic electrodeposition coating, comprising preparing a cathodic electrodeposition coating composition comprising a binder system, said binder system comprising:
   a) at least one basic, thermally crosslinkable resin selected from the group consisting of epoxy resins, polyurethane resins, and mixtures thereof, and
   b) from 0.001 to 1% by weight, based on the overall solids content of the binder system, of an acrylic polymer that is a copolymer consisting essentially of monomers selected from the group consisting of ethyl acrylate, n-propyl acrylate, and mixtures thereof.

* * * * *